(12) United States Patent
Tan et al.

(10) Patent No.: US 11,544,638 B2
(45) Date of Patent: Jan. 3, 2023

(54) METHOD AND SYSTEM FOR RECOMMENDING MULTI-MODAL ITINERARIES

(71) Applicant: Beijing DiDi Infinity Technology and Development Co., Ltd., Beijing (CN)

(72) Inventors: Bo Tan, Sunnyvale, CA (US); Shanxiang Qi, Burlingame, CA (US); Bin Pan, San Mateo, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 810 days.

(21) Appl. No.: 16/408,683

(22) Filed: May 10, 2019

(65) Prior Publication Data
US 2020/0356909 A1    Nov. 12, 2020

(51) Int. Cl.
| | | |
|---|---|---|
| G06Q 10/02 | (2012.01) | |
| G06N 20/00 | (2019.01) | |
| G06Q 50/30 | (2012.01) | |

(52) U.S. Cl.
CPC ........... *G06Q 10/025* (2013.01); *G06N 20/00* (2019.01); *G06Q 10/02* (2013.01); *G06Q 50/30* (2013.01)

(58) Field of Classification Search
CPC ...... G06Q 10/02; G06Q 10/025; G06Q 50/30; G06N 20/00
See application file for complete search history.

(56) References Cited

U.S. PATENT DOCUMENTS

| | | |
|---|---|---|
| 8,949,028 B1 | 2/2015 | Klampfl et al. |
| 2010/0280853 A1 | 11/2010 | Petralia et al. |
| 2013/0262222 A1 | 10/2013 | Gibson et al. |
| 2014/0257697 A1 | 9/2014 | Gishen |
| 2015/0345951 A1* | 12/2015 | Dutta ................. G01C 21/3469 701/400 |
| 2017/0316523 A1* | 11/2017 | Jafri ....................... G06Q 50/14 |
| 2017/0357914 A1 | 12/2017 | Tulabandhula et al. |
| 2018/0364054 A1 | 12/2018 | Chen et al. |
| 2019/0228347 A1* | 7/2019 | McSpadden, II ........................... G06F 16/90324 |
| 2019/0258967 A1* | 8/2019 | Gonzalez ............... G06Q 50/14 |

OTHER PUBLICATIONS

Delahaye, T., Acuna-agost, R., Bondoux, N., Nguyen, A., & Boudia, M. (2017). Data-driven models for itinerary preferences of air travelers and application for dynamic pricing optimization. Journal of Revenue and Pricing Management, 16(6), 621-639. (Year: 2017).*
PCT International Search Report and the Written Opinion dated Aug. 6, 2020, issued in related International Application No. PCT/CN2020/089318 (10 pages).

* cited by examiner

*Primary Examiner* — Resha Desai
*Assistant Examiner* — Carter P Brockman
(74) *Attorney, Agent, or Firm* — Sheppard Mullin Richter & Hampton LLP

(57) ABSTRACT

Itineraries may be recommended using rider context information relating to a rider. The rider context information may be obtained from various sources. Location information including an origin and a destination may obtained. A set of itineraries may be generated based on the rider context information. Each itinerary may include at least one mode of transportation to allow the rider to travel from the origin to the destination. Each itinerary in the set of itineraries may be ranked based on the rider context information.

17 Claims, 7 Drawing Sheets

_310_ — Multimodal: $12, est. arrival at 10:40 am

_320_ — Pool+: $14, est. arrival at 10:30 am

_330_ — PT: $10, est. arrival at 10:50 am

METHOD AND SYSTEM FOR RECOMMENDING MULTI-MODAL ITINERARIES

TECHNICAL FIELD

The disclosure relates generally to recommending a set of itineraries including multiple modes of transportation.

BACKGROUND

Ride sharing platforms may match drivers of personal cars or taxis with riders to provide on-demand transportation services. Two common goals of ride sharing platforms are to improve user experience and increase user engagement. The user experience may be improved and the user engagement may be increased by recommending a set of itineraries to the rider.

SUMMARY

One aspect of the present disclosure is directed to a system for recommending itineraries. The system may comprise one or more processors and one or more non-transitory computer-readable memories coupled to the one or more processors and configured with instructions executable by the one or more processors. Executing the instructions may cause the system to perform operations comprising: obtaining rider context information and obtaining location information. The location information includes an origin and a destination. The operations further include generating a set of itineraries based on the rider context information. Each itinerary in the set of itineraries includes at least one mode of transportation to allow the rider to travel from the origin to the destination. The operations further include ranking each itinerary in the set of itineraries based on the rider context information.

Another aspect of the present disclosure is directed to a method for recommending itineraries. The method includes obtaining rider context information and obtaining location information. The location information includes an origin and a destination. The method further includes generating a set of itineraries based on the rider context information. Each itinerary in the set of itineraries includes at least one mode of transportation to allow the rider to travel from the origin to the destination. The method further includes ranking each itinerary in the set of itineraries based on the rider context information.

Yet another aspect of the present disclosure is directed to a non-transitory computer-readable storage medium configured with instructions executable by one or more processors to cause the one or more processors to perform operations comprising: obtaining rider context information and obtaining location information. The location information includes an origin and a destination. The operations further include generating a set of itineraries based on the rider context information. Each itinerary in the set of itineraries includes at least one mode of transportation to allow the rider to travel from the origin to the destination. The operations further includes ranking each itinerary in the set of itineraries based on the rider context information.

In some embodiments, the rider context information may include at least one of: demographic information and environmental data.

In some embodiments, the rider context information may include timing information indicating a time for a future trip time.

In some embodiments, the rider context information may include filtering criteria selected by the user. Each itinerary in the generated set of itineraries satisfies the filter criteria.

In some embodiments, the at least one mode of transportation may include at least one of: a self-controlled transportation mode and a non-self-controlled transportation mode.

In some embodiments, a set of historical itineraries generated in response to a historical rider request may be obtained; historical context information associated with the historical rider request may be obtained; a historical itinerary selection from the set of historical itineraries may be obtained; and a machine learning model may be trained based on the historical context information and the historical itinerary selection.

In some embodiments, ranking each itinerary in the set of itineraries may include: inputting the rider context information into the machine learning model; scoring each itinerary in the set of itineraries based on a set of results from the machine learning model; and ranking the score of each itinerary in the set of itineraries in descending order.

In some embodiments, an itinerary selected by the rider may be obtained; and the machine learning model may be updated based on the rider context information and the itinerary selected by the rider.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein may improve a user experience and increase user engagement by recommending multiple different itinerates to a rider to allow the rider to choose the itinerary which is most suitable for the rider. Ride sharing platforms match riders with drivers to provide transportation services. A rider may also be matched with co-riders who travel along similar routes to create a carpool. Riders may be required to walk to pick-up locations or from drop-off locations. A ride sharing platform may plan trip itineraries with multiple transportation modes. Trip itineraries may be ranked based on personal profiles, environmental information, and historical preferences using machine learning. Riders often interface with ride sharing platforms through mobile applications with limited visual space. Highly ranked itineraries may be displayed first so that a rider does not need to scroll to see them. This may allow each rider to easily choose the most suitable itinerary based on the context and other factors the rider cares about.

Real-world matching, scheduling and transporting may be executed. Transportation modes may include solo and carpool ride sharing modes, as well as public transits, bicycles, scooters, self-driving cars, flights, and boats. As a result, the flexibility of choices for riders based on their preferences in terms of many factors may be largely expanded. The user experience for the riders may improve, and the goal of increased user engagement may be achieved. Additionally, by introducing many cheaper options, more price-sensitive new users may be attracted to the platform, contributing to user and revenue growth.

Figure 1A:
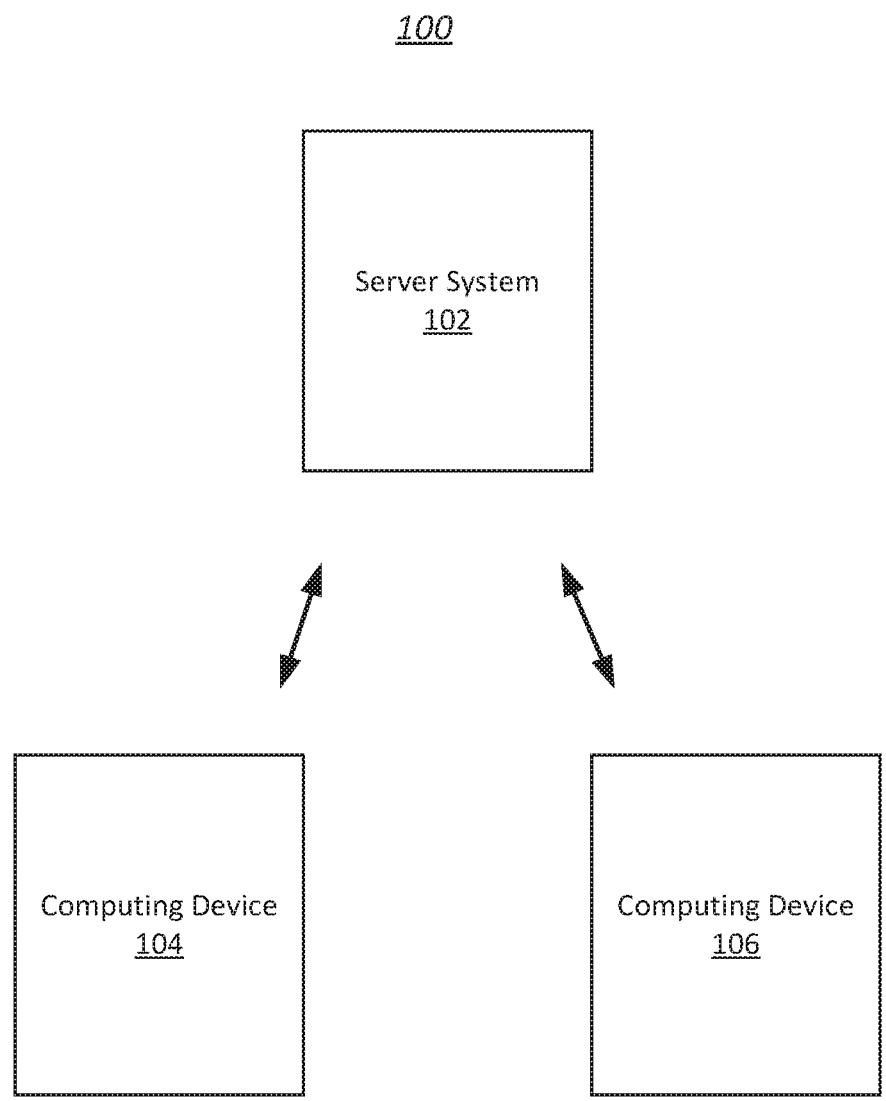
FIG. 1A illustrates an example environment to which techniques for recommending itineraries can be applied, in accordance with various embodiments of the disclosure.

FIG. 1A illustrates an example environment 100 to which techniques for recommending itineraries can be applied, in accordance with various embodiments. The example environment 100 may include a server system 102, a computing device 104, and a computing device 106. It is to be understood that although two computing devices are shown in FIG. 1A, any number of computing devices may be included in the environment 100. Server system 102 may be implemented in one or more networks (e.g., enterprise networks), one or more endpoints, one or more servers, or one or more clouds. A server may include hardware or software which manages access to a centralized resource or service in a network. A cloud may include a cluster of servers and other devices which are distributed across a network. The computing devices 104 and 106 may be implemented on or as various devices such as mobile phone, tablet, server, desktop computer, laptop computer, vehicle (e.g., car, truck, boat, train, autonomous vehicle, electric scooter, electric bike), etc. The server system 102 may communicate with the computing devices 104 and 106, and other computing devices. Computing devices 104 and 106 communicate with each other through server system 102, and may communicate with each other directly. Communication between devices may occur over the internet, through a local network (e.g., LAN), or through direct communication (e.g., BLUETOOTH™, radio frequency, infrared).

Figure 1B:
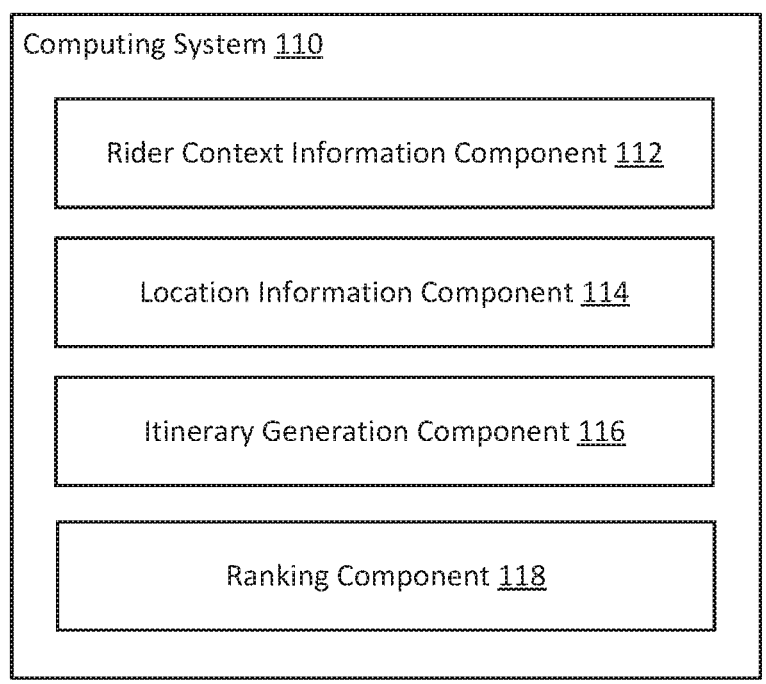
FIG. 1B illustrates an example computing system for recommending itineraries, in accordance with various embodiments of the disclosure.

FIG. 1B illustrates an example computing system 110 for recommending itineraries, in accordance with various embodiments. Computing system 110 may be implemented in environment 100. While the computing system 110 is shown in FIG. 1B as a single entity, this is merely for ease of reference and is not meant to be limiting. One or more components or one or more functionalities of the computing system 110 described herein may be implemented in a single computing device or multiple computing devices. For example, computing system 110 may be entirely included in the server system 102 or the computing device 104 or 106. In another example, computing system 110 may be implemented across server system 102, computing device 104, and computing device 106.

The computing system 110 may include a rider context information component 112, a location information component 114, an itinerary generation component 116, and a ranking component 118. The computing system 110 may include other components. The computing system 110 may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and memory (e.g., permanent memory, temporary memory). The processor(s) may be configured to perform various operations by interpreting machine-readable instructions stored in the memory. The computing system 110 may include other computing resources. In some implementations, computing system 110 may comprise a single self-contained hardware device configured to be communicatively coupled or physically attached to a component of a computer system. In some implementations, computing system 110 may include an application specific integrated circuit (ASIC) or a field-programmable gate array (FPGA) configured to perform transaction verification operations associated with one or more decentralized applications. The computing system 110 above may be installed with appropriate software (e.g., platform program, etc.) and/or hardware (e.g., wires, wireless connections, etc.) to access other devices of the environment 100.

The rider context information component 112 may be configured to obtain rider context information. Rider context information may include any information which may be used to determine the preferences of a rider. For example, rider context information may include background information about the rider, information about past rider behaviors, information entered by the rider, and information based on where the rider is located. Obtaining information may include one or more of accessing, acquiring, analyzing, determining, examining, identifying, loading, locating, opening, receiving, retrieving, reviewing, storing, or otherwise obtaining the information. The rider context information component 112 may obtain rider context information from one or more locations. For example, the rider context information component 112 may obtain rider context information from a storage location, such as an electronic storage of the computing system 110, server system 102, computing device 104, computing device 106, an electronic storage of a device accessible via a network (e.g., server), one of more client devices (e.g., desktop, laptop, smartphone, tablet, mobile device), or other locations. Rider context information may be stored in association with a personal profile of the rider. A rider profile may include user preferences selected by a rider.

In some embodiments, the rider context information may include demographic information and environmental data. In some embodiments, demographic information may include age, gender, education level, income level, marital status, occupation, and religion. Demographic information may additionally include information about the rider's use of the multimodal transportation platform. For example, the demographic information may include a cumulative number of trips the user has completed using the multimodal transportation platform, a total length of time the rider has used the multimodal transportation platform for (e.g. the period between the current date and the date the user signed up for the platform), and how actively the rider uses the multimodal transportation platform (e.g., the number of trips a rider has completed in 1-day, 3-day, 7-day, 1-month, 3-month, 6-month, 1-year, etc.).

In some embodiments, environmental data may include available modes of transportation. Modes of transportation may include self-controlled transportation modes and non-self-controlled transportation modes. Self-controlled transportation modes may include walking, biking, and scooting. For example, bikes or scooters may be part of a bike or scooter sharing program. Non-self-controlled transportation modes may include ride sharing and public transportation. Ride sharing may include a solo or carpool (i.e. multiple riders) service. Ride sharing may use vehicles with human drivers or self-driving vehicles. Public transportation may include heavy rail services (e.g. Amtrak), light rail services (e.g. metro, subway), buses, trolleys, ferries, and airplanes.

In some embodiments, modes of transportation may be owned by the provider of multimodal transportation platform. In some embodiments, modes of transportation may be owned by third party vendors. In some embodiments, the multimodal transportation platform may communicate with the third party vendors through Application Programing Interfaces (APIs). For example, the multimodal transportation platform may send a request for a transportation service through an API. In some embodiments, the multimodal transportation platform may crawl websites for publicly accessible information of the third party vendor. In some embodiments, the third party vendor may be a government. For example, the multimodal transportation platform may crawl a government website to monitor a train or bus schedule.

In some embodiments, environmental data may include weather, ruggedness of the terrain, time (e.g. 9:00 am), time of day (e.g. day, night, morning, evening), and safety properties of the origin and destination, special events (e.g., festivals, concerts, sporting events), and points of interest at the origin and destination. In some embodiments, environmental data may include two-side marketplace balance. Two-side marketplace balance may include supply and demand for the different modes of transportation at the time of each historical request.

In some embodiments, environmental data may include pricing data. Pricing data may include different prices for the different modes of transportation. The pricing data may include the price for one of the modes of transportation, or the price for the entire trip. In some embodiments, the pricing data may be estimated. In some embodiments, the pricing data may include a platform-controlled part, plus standard third-party charges (e.g., public transit tickets). In some embodiments, the pricing data may include a bundle price for a multi-modal transportation service, controlled totally by the platform. For example, the estimated pricing data may be included in a monthly subscription to the multimodal transportation platform. In some embodiments, corresponding payments for third-party transportation modes may be integrated with the multimodal transportation platform. For example, the multimodal transportation platform may provide payment to the third-party transportation modes either before or after the multimodal transportation platform receives payment from the rider.

In some embodiments, environmental data may include estimated travel times. Estimated travel times may include a length of time for a single transportation mode, or a length of time for an entire itinerary. Estimated travel times may include a best case scenario, a worst case scenario, and an average travel time. In some embodiments, environmental data may include inconvenience in certain transportation modes. In some embodiments, inconvenience may include a number of exchanges between transportation modes. In some embodiments, inconvenience may include a distance and a duration for self-controlled transportation modes (e.g., the distance a rider must walk). In some embodiments, inconvenience may include crowdedness of non-self-controlled transportation modes (e.g. crowdedness of carpooling, crowdedness of public transportation). In some embodiments, inconvenience may include potential detour time (e.g. to pick up other riders for carpooling).

In some embodiments, the rider context information may include timing information indicating a time for a future trip time. The future trip time may be for later in a same day, or for another day. The time for a future trip time may include an arrival time or a departure time. For example, using either an arrival or departure time, the rider can search for evening commute itineraries in the morning. In some embodiments, the future trip time may be entered by the rider. In some embodiments, the rider context information may include timing information indicating that the rider desires to depart as soon as possible. For example, if the rider does not enter a future trip time, the multimodal transportation platform may default to recommending itineraries immediately.

In some embodiments, the rider context information may include filtering criteria selected by the rider. The filtering criteria may include avoiding certain transportation modes (e.g. buses, trains, carpooling), highways, and tolls. The filtering criteria may additionally include an upper limit of transportation mode exchanges, a maximum walking distance, a maximum cost, and a maximum travel time.

In some embodiments, the rider context information may include historical choices of the rider. For example, the price, estimated duration, a number of transportation modes, and types of transportation modes may be recorded as rider context information when a rider selects an itinerary.

The location information component 114 may be configured to obtain location information. The location information may include an origin and a destination. The origin, destination, and other location information may comprise GPS (Global Positioning System) coordinates. In some embodiments, the location information may include origins or destinations for an intermediate transportation mode. For example, if an itinerary includes multiple transportation modes, the location information may include origins and destinations for each transportation mode. In some embodiments, the location information may include a common intermediate location. For example, an itinerary may include taking public transportation to the intermediate location, from which rider sharing will begin. In some embodiments, the origin and destination may be entered by the rider. In some embodiments, the origin may be determined using the location of the rider's device (e.g. using GPS or access points connected to the rider's device).

The itinerary generating component 116 may be configured to generate a set of itineraries based on the rider context information. A set may include a collection of one or more items. For example, a set may include an array, a list, a tree, a table, or a matrix. Each item in a set may include a set of items (e.g., 2D set, 3D set). Each itinerary in the set of itineraries may include at least one mode of transportation to allow the rider to travel from the origin to the destination. For example, an itinerary may include only a single mode of transportation to travel all the way from the origin to the destination. An itinerary may include at least a first non-self-controlled transportation mode and a second non-self-controlled transportation mode. An itinerary may include multiple consecutive different modes of transportation. For example, an itinerary may include a public transportation mode followed by a ride sharing mode. A single transportation mode may be included two or more time in a single itinerary. For example, an itinerary may include multiple types of public transportation. The first transportation mode may start at the origin and the last transportation mode may end at the destination, so that together, all of the modes allow the rider travel from the origin to the destination. Multimodal transportation sequences may satisfy timing requirements. Certain time margins may be kept to make a smooth exchange between two adjacent transportation modes. For example, a subsequent transportation mode may be scheduled to begin five minutes after the previous transportation mode ends. Timing and pricing may be calculated for each itinerary.

In some embodiments, the set of itineraries may be filtered to exclude itineraries that fail to include filtering criteria. The filtering criteria may be selected by a rider, and the generated set of itineraries may be generated based on which itineraries satisfy the filtering criteria. For example, itineraries including ineligible modes of transportation may be excluded. For example, carpooling modes having two or more riders may be filtered out. The set of itineraries may be limited to only itineraries including one transportation mode. For example, a set of itineraries may be limited to include one itinerary including public transportation, and another itinerary including ride sharing.

In some embodiments, the ranking component 118 may be configured to rank each itinerary in the set of itineraries based on the rider context information. The goal of the ranking may be to predict which itineraries a rider is the most likely to select. The ranking may be accomplished using machine learning models.

In some embodiments, machine learning (ML) models may be used to generate scores for each possible itinerary, and the scores may be used to rank the itineraries. ML ranking may include model training and model serving. ML models may include formulations. A formulation may include an equation with a vector of features as the independent variable and a weight as the dependent variable. Features may include rider context information. Vectors may include lists, arrays, columns in a matrix, or columns in a table. Weights may include a probability that a rider will select an itinerary. A probability may be represented as a number from zero to one (e.g., 0, 0.78, 1), or a percentage (e.g., 0%, 78%, 100%). ML models may classify specific trip itineraries based on the probability that each itinerary will be selected by a rider. The weight may be the score used to rank each itinerary. ML models may include Logistic regression (LR), Random forest (RF), Deep neural network (DNN), etc.

Model training may include supervised learning and semi-supervised learning. A set of known features and a corresponding known weight may be used to train the model. ML model training may include determining a set of hyperparameters. Regularization techniques may be used to avoid model overfitting. Model training may be performed offline (e.g., cyclically with refreshed data), or performed online (e.g., using any form of stochastic gradient descent techniques).

Known features may include historical context information. Historical context information may include rider context information and location information associated with a historical rider request. For example, historical context information may include the same types of rider context information obtained by rider context information component 112 and location information obtained by location information component 114. Features used in the model training may include feature crosses of any of the individual features. For example, a ML model may be trained based on any combination of the historical context information. Historical context information which provides the best prediction performance may be selected.

A known weight may include an indication whether or not a rider selected a historical itinerary for a pervious trip. A historical itinerary may comprise an item included in a set of historical itineraries which was generated in response to a historical rider request. A known weight may include a binary value. For example, the know weight may be based on a historical itinerary selection from the set of historical itineraries (e.g., 1 representing a chosen itinerary, 0 representing that an itinerary was not chosen). The combination of the known features and the know weight may be used to train the model. A ML model may be trained based on the historical context information and the historical itinerary selection. For example, data from the rider's profile and historical data on pricing, timing, walking distance, and weather may be used to train a model. In some embodiment, two-side marketplace balance at the time of each historical request may be used to train a model. For example, if there is a high demand (e.g. a high number of requests) and one or more of the transportation modes have decreased supply available, a score of itineraries including the corresponding transportation mode may be decreased.

A model may be trained at different levels of granularities. For example, a model may be maintained for each person, each city, or mega-region (i.e., multi-city). A model may be chosen and applied based on the performance and maintenance complexity of the models.

Model serving may include generating a prediction based on new sample information. Realtime data for the features may be evaluated in a trained ML model to generate a prediction probability weight. For example, model serving may be triggered based on a new request for ride sharing. The new sample information may comprise the obtained rider context information. The rider context information may be input into the ML model. Each itinerary in the set of itineraries may be scored based on a set of results from the machine learning model. The score may correspond to a likelihood that the rider will select the itinerary. The scores may be used to rank each itinerary in a set of itineraries in descending order. For example, itineraries with a higher probability of being selected by the rider based on the current rider context information may be ranked higher.

Higher ranked itineraries may be displayed with more priority (i.e., in highly visible locations).

In some embodiments, an itinerary selected by a rider and affiliated feature values may be recorded as new sample data. The new sample data may be used for future model training. For example, an itinerary selected by the rider may be recorded along with the rider context information. The information may be recorded on a local or remote computing device. The machine learning model used to rank the itineraries may be updated based on the rider context information and the itinerary selected by the rider.

In some embodiments, itineraries may be ranked at server system 102 and sent to computing device 104 or 106. In some embodiments, itineraries may be ranked at computing device 104 or 106. A list of ranked itineraries may be displayed on computing device 104 or 106, or computing system 110. In some embodiments, data analytics may be performed on a list of ranked itineraries. For example, data analytics may be used to improve the ride sharing platform.

Figure 2:
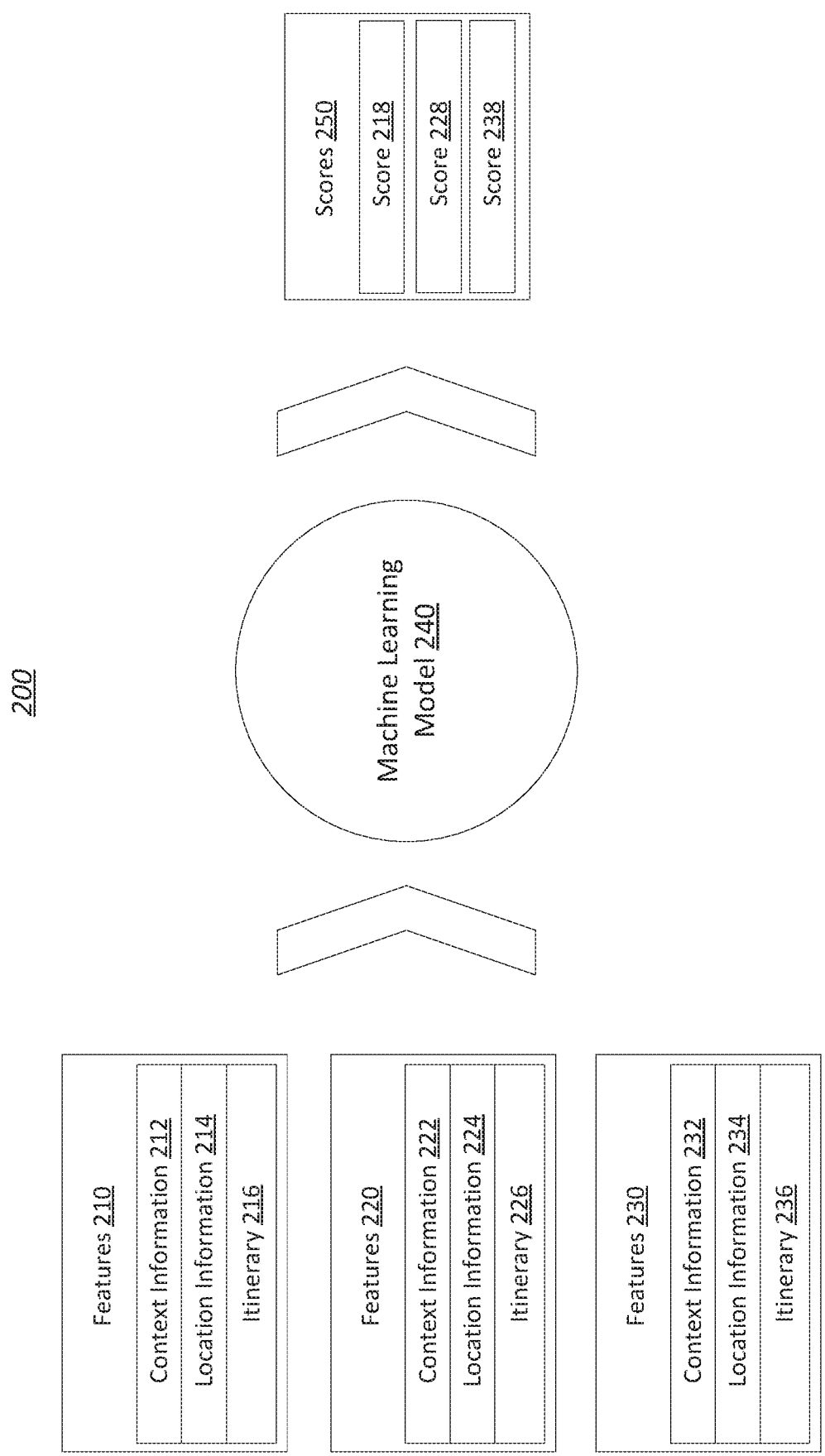
FIG. 2 illustrates an example process for scoring itineraries using machine learning, in accordance with various embodiments of the disclosure.

FIG. 2 illustrates an example process 200 for scoring itineraries using machine learning, in accordance with various embodiments of the disclosure. Process 200 may include features 210, 220, and 230, machine learning model 240, and scores 250. Features 210, 220, and 230 may be evaluated using machine learning model 240. Features 210, 220, and 230 may include context information 212, 222, and 232, location information 214, 224, and 234, and itineraries 216, 226, and 236 respectively. Context information 212, 222, and 232 may include the rider context information obtained by rider context information component 112 of FIG. 1B. Location information 214, 224, and 234 may include location information obtained by location information component 114 of FIG. 1B. Machine learning model 240 may include a ML model used by ranking component 118 of FIG. 1B. Scores 250 may include score 218, score 228, and score 238. Scores 218, 228, and 238 may include results of evaluations performed by machine learning model 240. For example, score 218 may result from evaluating features 210 using machine learning model 240, score 228 may result from evaluating features 230 using machine learning model 240, and score 238 may result from evaluating features 230 using machine learning model 240.

Figure 3:
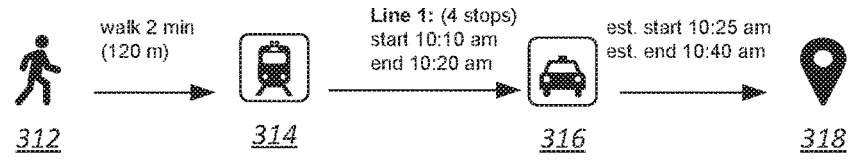
FIG. 3 illustrates an example set of itineraries, in accordance with various embodiments of the disclosure.
Figure 3:
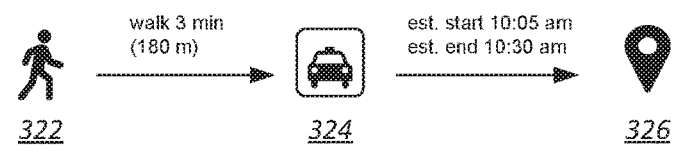
Figure 3:
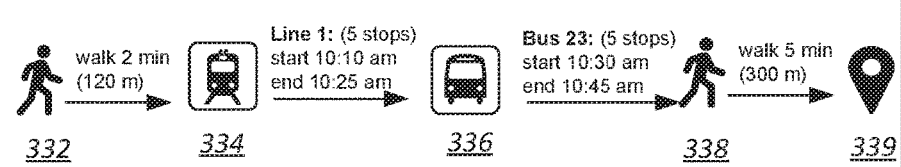

FIG. 3 illustrates an example set of itineraries 300, according to various embodiments of the present disclosure. The set of itineraries 300 may be stored on an electronic storage of the server system 102, computing device 104, computing device 106, computing system 110, an electronic storage of a device accessible via a network (e.g., server), one of more client devices (e.g., desktop, laptop, smartphone, tablet, mobile device), or other locations. In some embodiments, the itineraries in the set of itineraries 300 may be ranked. The itineraries may be ranked based on which route the user is most likely to choose. The ranking algorithm may use the rider context information. For example, itineraries may be ranked using a ML model generated by ranking component 118 in FIG. 1. The highest ranked itineraries may be displayed in the most visible location. As a result, the highest ranked itineraries may appear in the rider's eye first. In some embodiments, the highest ranked itineraries may be displayed at the top of the page. For example, the itinerary that ranks first may be displayed first, the itinerary that ranks second may be displayed second, and so on.

The set of itineraries 300 may include multimodal itinerary 310, pool+ itinerary 320, and public transportation (PT) itinerary 330. The itineraries may include information to help a rider chose an itinerary. Multimodal itinerary 310 may include a price and an estimated arrival time. For example, the price may be $12 and the estimated arrival time may be 10:40 am. Multimodal itinerary 310 may include walking 312 as first transportation mode, public transportation 314 as a second transportation mode, a ride sharing service 316 as a third transportation mode, and a destination 318. The walking 312 may include a distance of 120 meters (m) and an estimated time of 2 minutes (min). The public transportation 314 may include an icon and a label indicating the type of public transportation, an indication of how many stops the transportation mode includes, a start time, and an end time. For example, the icon may be of a train, and the label may include "Line 1", "4 stops", "start 10:10 am", and end "10:20 am". The ride sharing service 316 may include a label indicating an estimated start time and an estimated end time. For example, the label may include "est. start 10:25 am", and est. end "10:40 am". In some embodiment, multimodal itinerary 310 may be displayed first as a result of receiving the highest score from the ML model.

Pool+ itinerary 320 may include a price and an estimated arrival time. For example, the price may be $14 and the estimated arrival time may be 10:30 am. Pool+ itinerary 320 may include walking 322 as first transportation mode, a ride sharing service 324 as a second transportation mode, and a destination 326. The walking 322 may include a distance of 180 m and an estimated time of 3 min. The ride sharing service 324 may include a label indicating an estimated start time and an estimated end time. For example, the label may include "est. start 10:05 am", and "est. end 10:30 am".

Public transportation (PT) itinerary 330 may include a price and an estimated arrival time. For example, the price may be $10 and the estimated arrival time may be 10:50 am. PT itinerary 330 may include walking 332 as first transportation mode, public transportation 334 as a second transportation mode, a public transportation 336 as a third transportation mode, walking 338 as a fourth transportation mode and a destination 339. The walking 332 may include a distance of 120 m and an estimated time of 2 min. The public transportation 334 may include an icon and a label indicating the type of public transportation, an indication of how many stops the transportation mode includes, a start time, and an end time. For example, the icon may be of a train, and the label may include "Line 1", "5 stops", "start 10:10 am", and "end 10:25 am". The public transportation 336 may comprise a different type of public transportation than public transportation 334. The public transportation 336 may include an icon and a label indicating the type of public transportation, an indication of how many stops the transportation mode includes, a start time, and an end time. For example, the icon may be of a bus, and the label may include "Bus 23", "5 stops", "start 10:30 am", and "end 10:45 am". The walking 338 may include a distance of 300 m and an estimated time of 5 min.

In some embodiments, the set of itineraries 300 may be provided to a rider through an I/O interface. An I/O interface may comprise an auditory interface and a visual interface. For example, the set of itineraries 300 may be played as audio using a speaker. In another example, the set of itineraries 300 may be displayed on a Graphical User Interface (GUI). The GUI may be displayed on the screen of a user device. For example, the user device may include all or part of computing device 104, computing device 106, or computing system 110.

In some embodiments, the highest ranked itineraries may be displayed in the middle of the page. In some embodiments, the rider may scroll the screen to view additional itineraries. For example, the additional itineraries may have received lower recommendation scores. Additional itineraries may be viewed by scrolling down, to the right, left, or upward.

Figure 4A:
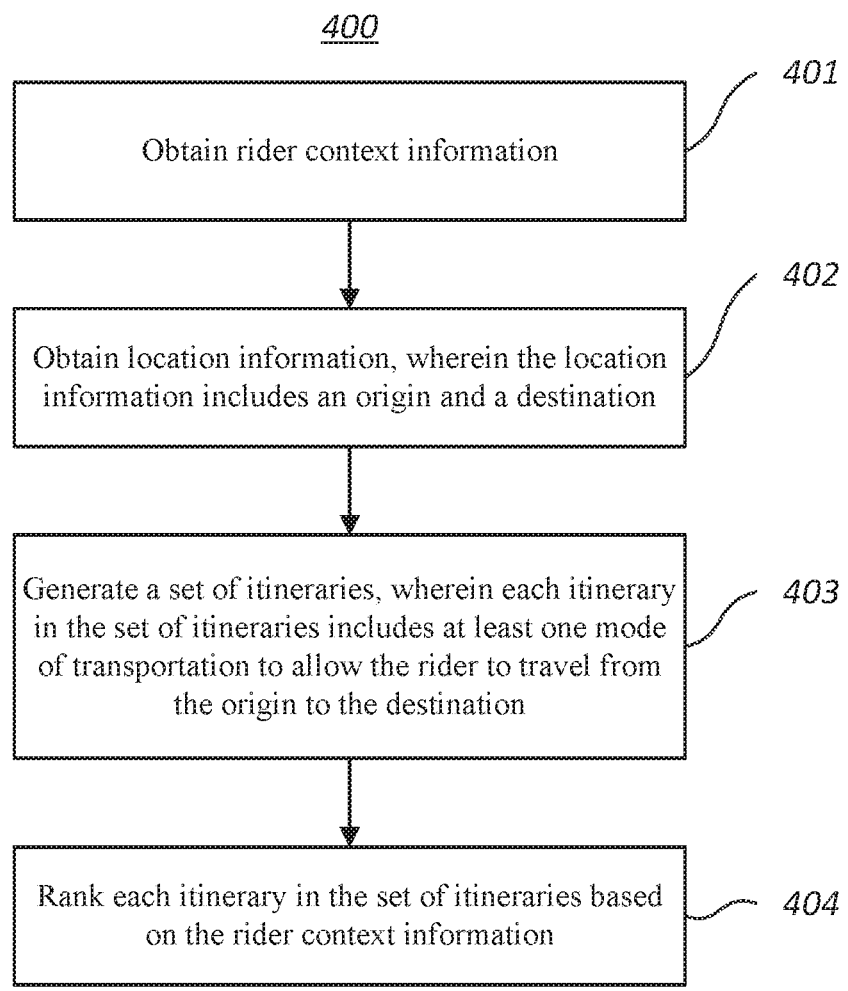
FIG. 4A illustrates a flowchart of an example method for recommending itineraries, according to various embodiments of the present disclosure.

FIG. 4A illustrates a flowchart of an example method 400 for recommending itineraries, according to various embodiments of the present disclosure. The method 400 may be implemented in various environments including, for example, the environment 100 of FIG. 1A and FIG. 1B. The operations of the method 400 presented below are intended to be illustrative. Depending on the implementation, the method 400 may include additional, fewer, or alternative steps performed in various orders or in parallel. The method 400 may be implemented in various computing systems or devices including one or more processors.

With respect to the method 400, at block 401, rider context information may be obtained. At block 402, location information including an origin and a destination may be obtained. At block 403, a set of itineraries may be generated, wherein each itinerary includes at least one mode of transportation to allow the rider to travel from the origin to the destination. At block 404, each itinerary in the set of itineraries may be ranked based on the rider context information.

Figure 4B:
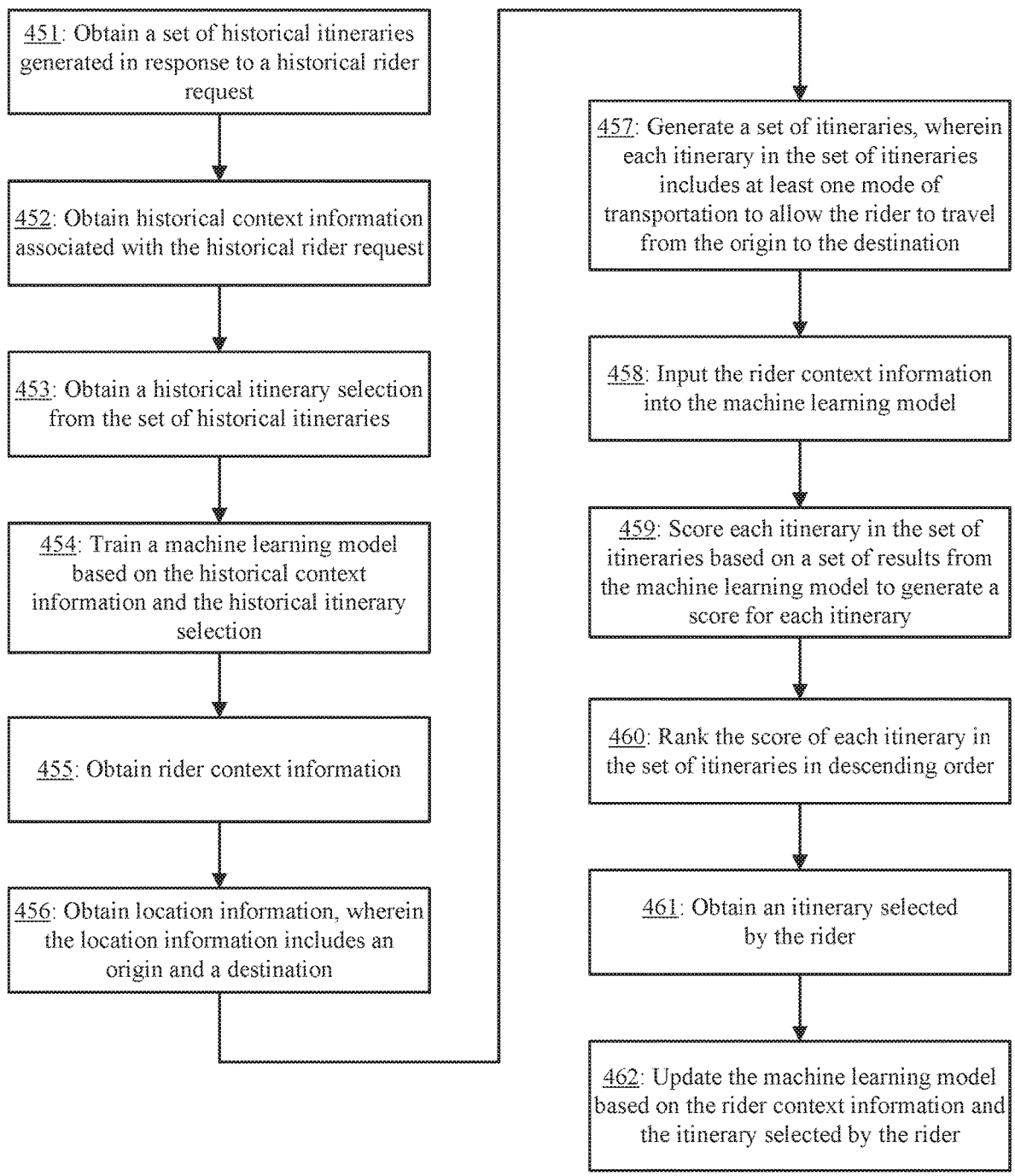
FIG. 4B illustrates a flowchart of an example method for recommending itineraries, according to various embodiments of the present disclosure.

FIG. 4B illustrates a flowchart of an example method 450 for recommending itineraries, according to various embodiments of the present disclosure. The method 450 may be implemented in various environments including, for example, the environment 100 of FIG. 1A and FIG. 1B. The operations of the method 450 presented below are intended to be illustrative. Depending on the implementation, the method 450 may include additional, fewer, or alternative steps performed in various orders or in parallel. The method 450 may be implemented in various computing systems or devices including one or more processors.

With respect to the method 450, at block 451, a set of historical itineraries generated in response to a historical rider request may be obtained. At block 452, historical context information associated with the historical rider request may be obtained. At block 453, a historical itinerary selection from the set of historical itineraries may be obtained. At block 454, a machine learning model based on the historical context information and the historical itinerary selection may be trained. At block 455, rider context information may be obtained. At block 456, location information including an origin and a destination may be obtained. At block 457, a set of itineraries may be generated, wherein each itinerary includes at least one mode of transportation to allow the rider to travel from the origin to the destination. At block 458, the rider context information may be input into the machine learning model. At block 459, each itinerary in the set of itineraries may be scored based on a set of results from the machine learning model to generate a score for each itinerary. At block 460, the score of each itinerary in the set of itineraries may be ranked in a descending order (or an ascending order). The itineraries may be displayed/recommended for a rider based on the ranking. In some embodiments, all generated itineraries may be displayed for the rider in the descending or ascending order. In some embodiments, a subset of all generated itineraries that have a score greater than a threshold may be selected for display, while hiding (not displaying) itineraries that do not have a score greater than the threshold. At block 461, an itinerary selected by the rider may be obtained. At block 462, the machine learning model may be updated based on the rider context information and the itinerary selected by the rider.

Figure 5:
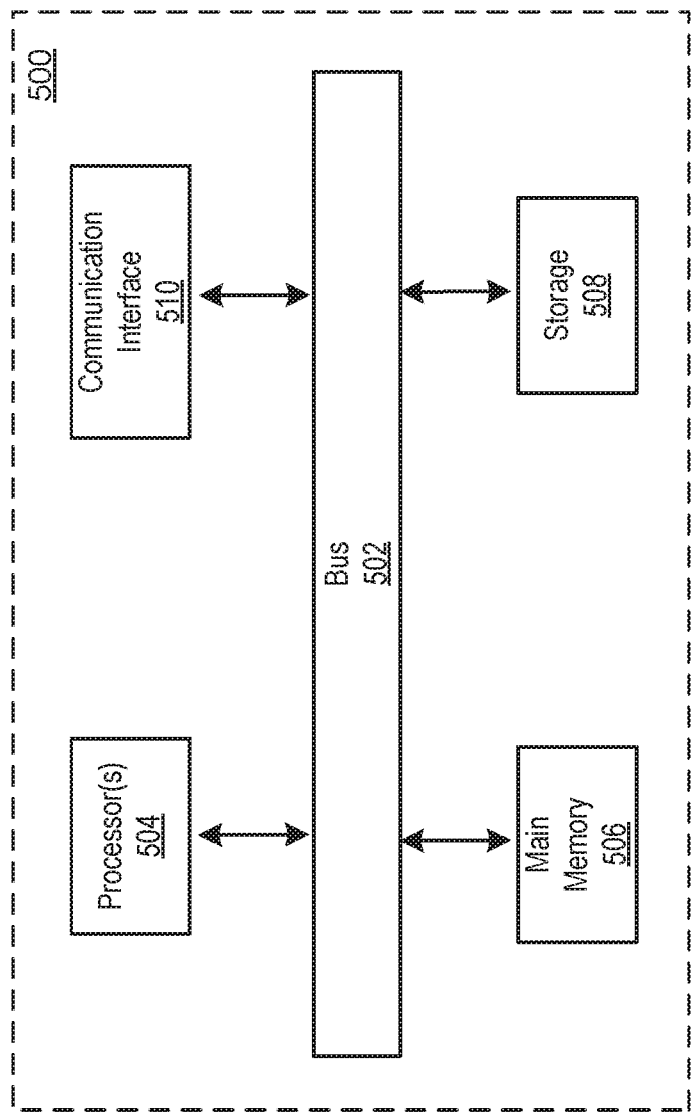
FIG. 5 is a block diagram that illustrates a computer system upon which any of the embodiments described herein may be implemented.

FIG. 5 is a block diagram that illustrates a computer system 500 upon which any of the embodiments described herein may be implemented. For example, the computer system 500 may be any one of the server system 102 and the computing devices 104 and 106. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor(s) 504. Main memory 506 also may be used for storing temporary variables or other intermediate information during execution of instructions to be executed by processor(s) 504. Such instructions, when stored in storage media accessible to processor(s) 504, render computer system 500 into a special-purpose machine that is customized to perform the operations specified in the instructions. Main memory 506 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 508. Execution of the sequences of instructions contained in main memory 506 causes processor(s) 504 to perform the process steps described herein.

For example, the computing system 500 may be used to implement server system 102, computing device 104, and computing device 106 shown in FIG. 1A. In another example, the computing system 500 may be used to implement the computing system 110 or one or more components of the computing system 110 shown in FIG. 1B. As another example, the process/method shown in FIGS. 4A and 4B and described in connection with this figure may be implemented by computer program instructions stored in main memory 506. When these instructions are executed by processor(s) 504, they may perform the steps as shown in FIGS. 4A and 4B and described above. In alternative embodiments, hard-wired circuitry may be used in place of or in combination with software instructions.

The computer system 500 also includes a communication interface 510 coupled to bus 502. Communication interface 510 provides a two-way data communication coupling to one or more network links that are connected to one or more networks. As another example, communication interface 510 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 110 may be described as performing or configured for performing an operation, when the components may comprise instructions which may program or configure the computing system 110 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A system, comprising one or more processors and one or more non-transitory computer-readable memories coupled to the one or more processors and configured with instructions executable by the one or more processors to cause the system to perform operations comprising:
   obtaining historical rider requests for rides and historical itinerary selections, wherein the historical rider requests comprise historical rider context information and historical location information associated with each historical rider request, and the historical itinerary selections comprise a set of historical itineraries generated by a ride-hailing platform and a selection from the set of historical itineraries;
   training a machine learning model based on the historical rider requests and the historical itinerary selections for generating scores for itinerary candidates in response to a given rider's request for a ride, wherein the scores represent likelihoods of the given rider selecting corresponding itinerary candidates;
   obtaining rider context information associated with a rider's request for a ride;
   obtaining location information, wherein the location information includes an origin and a destination;
   generating a set of itineraries, wherein each itinerary in the set of itineraries includes at least one mode of transportation to allow a rider to travel from the origin to the destination;
   feeding the rider context information and the set of itineraries into the trained machine learning model to obtain a plurality of scores;
   ranking each itinerary in the set of itineraries based on the plurality of scores;
   receiving a rider selection from the set of itineraries; and
   retraining the machine learning model based on the received rider selection and the rider context information.

2. The system of claim 1, wherein the rider context information includes at least one of: demographic information and environmental data.

3. The system of claim 1, wherein the rider context information includes timing information indicating a time for a future trip time.

4. The system of claim 1, wherein the rider context information includes filtering criteria selected by the rider, and wherein each itinerary in the generated set of itineraries satisfies the filtering criteria.

5. The system of claim 1, wherein the at least one mode of transportation includes at least one of: a self-controlled transportation mode and a non-self-controlled transportation mode.

6. A computer-implemented method, comprising:
   obtaining, by a computing device, a trained machine learning model for generating scores for itinerary candidates in response to a given rider's request for a ride, wherein the scores represent likelihoods of the given rider selecting corresponding itinerary candidates, wherein the trained machine learning model is trained based on historical rider requests for rides and historical itinerary selections, wherein the historical rider requests comprise historical rider context information and historical location information associated with each historical rider request, and the historical itinerary selections comprise a set of historical itineraries generated by a ride-hailing platform and a selection from the set of historical itineraries;
   obtaining, by the computing device, rider context information associated with a rider's request for a ride;
   obtaining, by the computing device, location information, wherein the location information includes an origin and a destination;
   generating, by the computing device, a set of itineraries, wherein each itinerary in the set of itineraries includes at least one mode of transportation to allow a rider to travel from the origin to the destination;
   feeding, by the computing device, the rider context information and the set of itineraries into the trained machine learning model to obtain a plurality of scores;
   ranking, by the computing device, each itinerary in the set of itineraries based on plurality of scores;
   receiving, by the computing device, a rider selection from the set of itineraries; and
   retraining, by the computing device, the machine learning model based on the received rider selection and the rider context information.

7. The method of claim 6, wherein the rider context information includes at least one of: demographic information and environmental data.

8. The method of claim 6, wherein the rider context information includes filtering criteria selected by the rider, and wherein each itinerary in the generated set of itineraries satisfies the filtering criteria.

9. The method of claim 6, wherein the at least one mode of transportation includes at least one of: a self-controlled transportation mode and a non-self-controlled transportation mode.

10. The method of claim 6, wherein the rider context information includes timing information indicating a time for a future trip time.

11. The method of claim 6, wherein the rider context information includes filtering criteria selected by the rider, and wherein each itinerary in the generated set of itineraries satisfies the filtering criteria.

12. The method of claim 6, wherein the at least one mode of transportation includes at least one of: a self-controlled transportation mode and a non-self-controlled transportation mode.

13. A non-transitory computer-readable storage medium configured with instructions executable by one or more processors to cause the one or more processors to perform operations comprising:
   obtaining a trained machine learning model for generating scores for itinerary candidates in response to a given rider's request for a ride, wherein the scores represent likelihoods of the given rider selecting corresponding itinerary candidates, wherein the trained machine learning model is trained based on historical rider requests for rides and historical itinerary selections, wherein the historical rider requests comprise historical rider context information and historical location information associated with each historical rider request, and the historical itinerary selections comprise a set of historical itineraries generated by a ride-hailing platform and a selection from the set of historical itineraries;
   obtaining rider context information associated with a rider's request for a ride;
   obtaining location information, wherein the location information includes an origin and a destination;
   generating a set of itineraries, wherein each itinerary in the set of itineraries includes at least one mode of transportation to allow a rider to travel from the origin to the destination;
   feeding the rider context information and the set of itineraries into the trained machine learning model to obtain a plurality of scores;
   ranking each itinerary in the set of itineraries based on the plurality of scores;
   receiving a rider selection from the set of itineraries; and
   retraining the machine learning model based on the received rider selection and the rider context information.

14. The non-transitory computer-readable storage medium of claim 13, wherein the rider context information includes at least one of: demographic information and environmental data.

15. The non-transitory computer-readable storage medium of claim 13, wherein the rider context information includes timing information indicating a time for a future trip time.

16. The non-transitory computer-readable storage medium of claim 13, wherein the rider context information includes filtering criteria selected by the rider, and wherein each itinerary in the generated set of itineraries satisfies the filtering criteria.

17. The non-transitory computer-readable storage medium of claim 13, wherein the at least one mode of transportation includes at least one of: a self-controlled transportation mode and a non-self-controlled transportation mode.

* * * * *